Figures 4, 5:
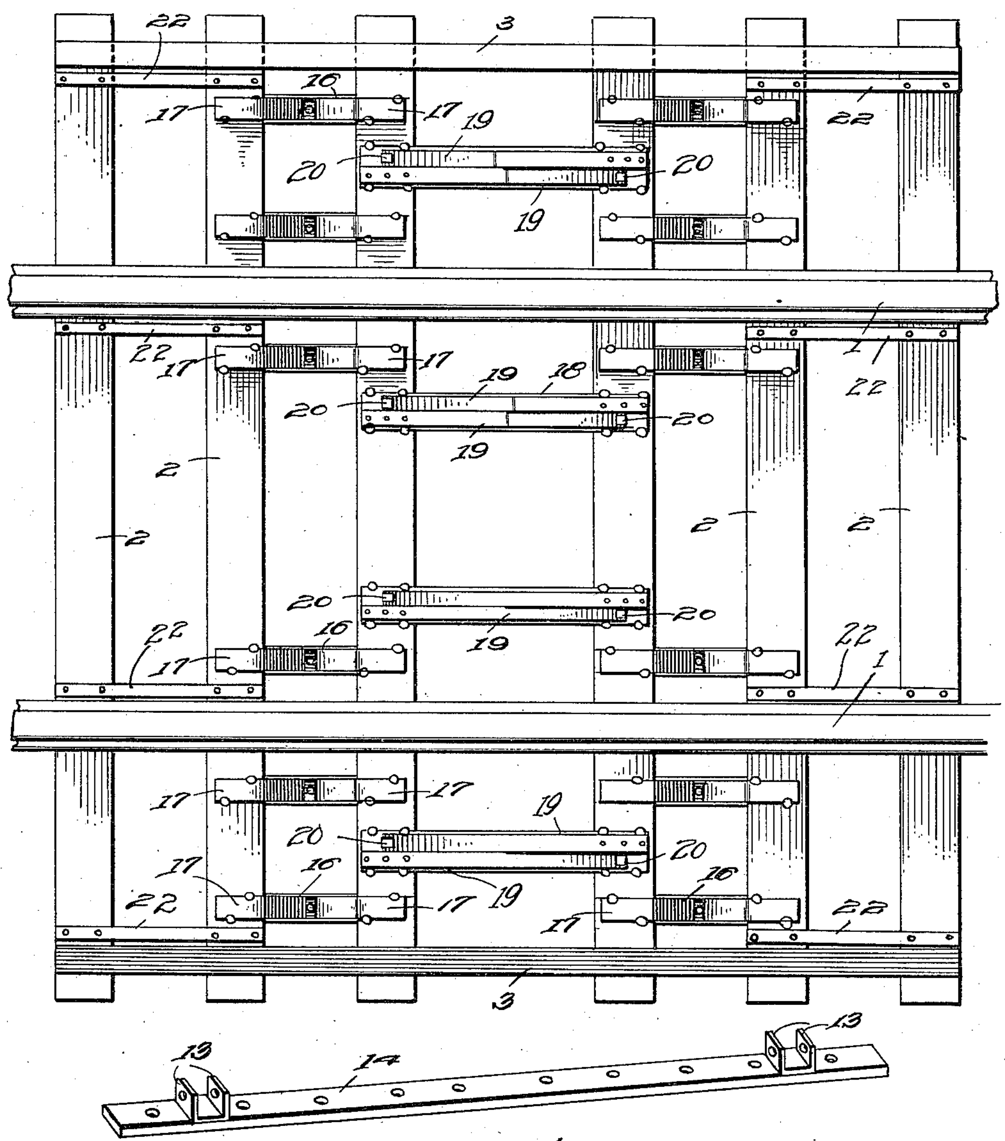

J. W. COMER.
CATTLE GUARD FOR RAILWAYS.
APPLICATION FILED APR. 8, 1911.
1,011,033.
Patented Dec. 5, 1911.
3 SHEETS—SHEET 1.
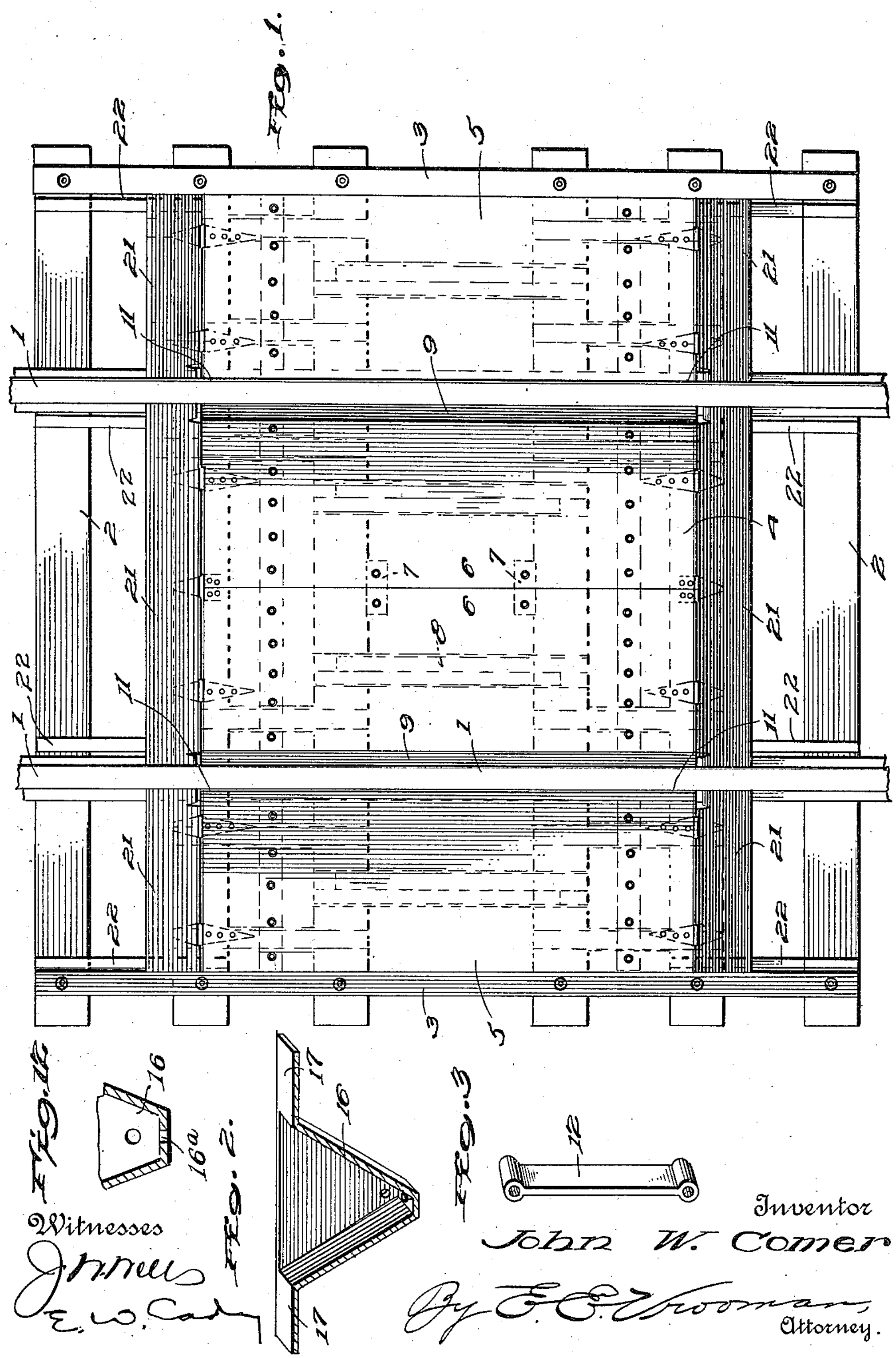
COLUMBIA PLANOGRAPH CO., WASHINGTON, D. C.

J. W. COMER.

CATTLE GUARD FOR RAILWAYS.

APPLICATION FILED APR. 8, 1911.

1,011,033.

Patented Dec. 5, 1911.

3 SHEETS—SHEET 2.

Witnesses

J. H. Mills

E. W. Cady

Inventor

John W. Comer

By E. E. Vrooman,

Attorney.

COLUMBIA PLANOGRAPH CO., WASHINGTON, D. C.

J. W. COMER.
CATTLE GUARD FOR RAILWAYS.
APPLICATION FILED APR. 8, 1911.
1,011,033. Patented Dec. 5, 1911.
3 SHEETS—SHEET 3.
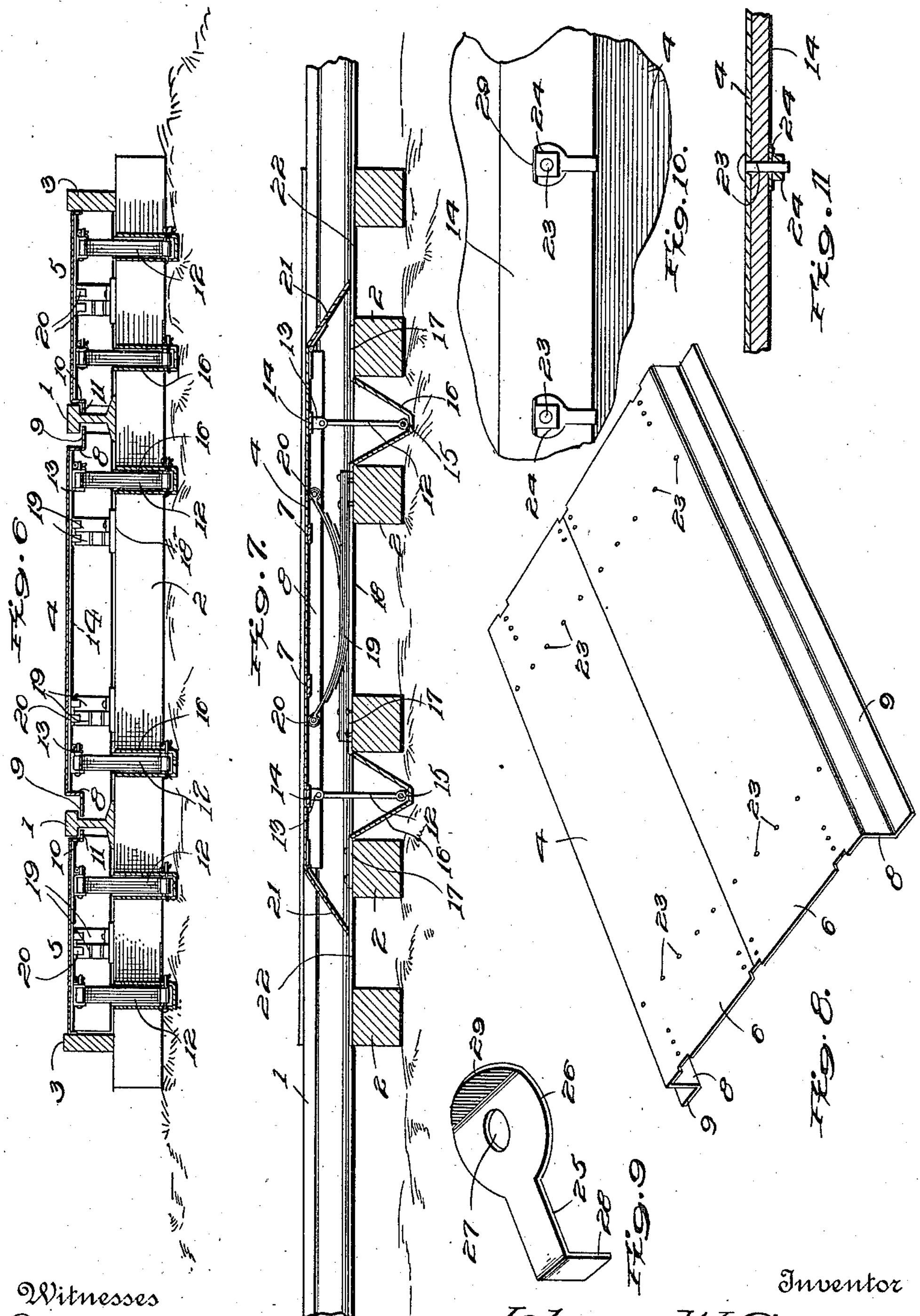
Witnesses
J. W. Mills
E. W. Cady
Inventor
John W. Comer.
By E. E. Vrooman, Attorney.
COLUMBIA PLANOGRAPH CO., WASHINGTON, D. C.

UNITED STATES PATENT OFFICE.

JOHN W. COMER, OF ULM, MONTANA.

CATTLE-GUARD FOR RAILWAYS.

1,011,033. Specification of Letters Patent. Patented Dec. 5, 1911.

Application filed April 8, 1911. Serial No. 619,815.

*To all whom it may concern:*

Be it known that I, JOHN W. COMER, a citizen of the United States, residing at Ulm, in the county of Cascade and State of Montana, have invented certain new and useful Improvements in Cattle-Guards for Railways, of which the following is a specification, reference being had therein to the accompanying drawing.

This invention relates to cattle guards for preventing cattle and other live stock from crossing railroad tracks from one field to another.

The invention has special reference to cattle guards of this kind which are so constructed and arranged that when the cattle attempt to step upon the same it will yield and thereby cause the cattle to retreat.

The invention has for its object to provide an improved cattle guard of this kind which will be simple in construction and effective in operation, and may be readily repaired.

Referring to the accompanying drawings: Figure 1 is a plan view of a section of a railway track provided with a cattle guard constructed in accordance with this invention. Fig. 2 is an enlarged detail view of one of the members of the sub-structure of the cattle guard, in vertical section. Fig. 3 is an enlarged detail view of another member of the sub-structure of the cattle guard. Fig. 4 is a plan view of the device shown in Fig. 1 with the top of the cattle guard removed. Fig. 5 is an enlarged detail view in perspective of one of the brace members of the top of the cattle guard. Fig. 6 is an end view in cross section of the device shown in Fig. 1. Fig. 7 is a side view in longitudinal section of the device shown in Fig. 1. Fig. 8 is a detail view in perspective of one of the top plates of the cattle guard. Fig. 9 is a detail view in perspective of a washer serving as a nut lock in the cattle guard. Fig. 10 is an enlarged detail view of the underside of a portion of one of the top plates of the cattle guard and one of the brace bars showing the means for locking the brace bar thereto. Fig. 11 is a detail view in longitudinal section of a portion of the device shown in Fig. 10. Fig. 12 is a detail section of the lower end of the socket member which is adapted to support the tread supporting rods showing the drain aperture formed in the bottom of said socket member.

In the accompanying drawings a portion of the rails 1 resting on ties 2 of a railway track are shown together with longitudinal beams or strips 3 secured to the outer ends of the ties 2. Located between the rails 1 is a sheet metal plate 4 and between each rail 1 and the outer longitudinal beam 3 is a sheet metal plate 5. The plates 4 and 5 are preferably formed of sheet steel and the plate 4 is preferably formed of two sections 6 secured together at their abutting edges by metallic straps 7 riveted thereto. The outer edge of each side of the plate 4 is formed with a depending portion 8 from the lower end of which projects a lateral flange 9, the edge of which is located beneath the head of a rail 1. The inner side of each of the plates 5 is formed with a depending portion 10 having at its lower end a lateral flange 11 which projects beneath the head of the adjacent rail 1. The opposite edge of each plate 5 is located adjacent to the longitudinal beam 3. The plates 4 and 5 are supported on pairs of vertical rods 12 located at each end of said plates each of said rods 12 being hinged at its upper end to a pair of ears 13 depending from a brace bar 14 extending across the under side of the plates 4 and 5 adjacent to each end thereof. The other end of each of the rods 12 is hinged to a bolt 15 at the bottom of a V-shaped metallic socket member 16 provided with lateral flanges 17 which are secured to cross ties 2. Located beneath the middle portion of the plate 4 are pairs of transverse plates 18 secured at their ends to cross ties 2 and secured to each of said transverse plates 18 are pairs of carriage springs 19 each secured at one end to the opposite ends of the plate 18, the other end of each of the carriage springs 19 being provided with a friction roller 20 which bears against the underside of the plate 4. The plates 5 each have a pair of carriage springs 19 mounted beneath the middle portion of said plates similarly to the springs employed in connection with the plate 4. Hinged to each end of the plates 4 and 5 is a transverse plate 21 which is inclined downward and loosely rests upon metallic strips 22 secured to a pair of cross ties 2.

The brace bars 14 are preferably secured to the plate 4 by means of bolts 23 and nuts 24, said nuts being held in position by means of a piece of sheet metal formed with a short narrow strip 25, and a circular washer head 26 having a bolt hole 27, the strip 25 having a lateral bent end portion 28. This device is placed against the brace bar 14 on the bolt 23 and after the nut 24 has been screwed up on the bolt the portion 29 of the washer 26 is bent over the side of the nut and with the bent portion 28 overlapping the edge of the brace bar 14 serves as a nut lock.

By means of the foregoing construction a cattle guard is provided which will prevent the cattle and other live stock from crossing the railway track, since when they attempt to step upon the plates 4 and 5, the latter will yield to the weight of the animals, thereby stopping them and causing them to retreat. It will be seen that the pressure by reason of an animal stepping upon the plates 4 and 5 will cause said plates to yield when pressing the springs 19, thereby causing the plates 4 and 5 whenever pressure is brought to bear upon them to move longitudinally and downwardly in either direction, according as the pressure is produced thereon. The socket member is provided with a drain aperture 16[a] formed in the bottom thereof.

What I claim is:—

1. In a cattle guard of the character described, a sheet metal plate located adjacent to a railroad track and having pairs of vibratory supports, and sets of springs normally holding said plate in elevated position and permitting said plate to have a longitudinal and downward movement.

2. In a cattle guard of the character described, a railway track, a sheet metal plate located between the rails of said track, pairs of vibratory supports beneath said sheet metal plate, and pairs of springs located beneath and having a sliding bearing against said sheet metal plate.

3. In a cattle guard of the character described, a railway track, a sheet metal plate located between the rails of said track and having a lateral flange at each side projecting beneath the head of the adjacent rail, pairs of vibratory rods secured to the underside of said plate adjacent to each end thereof, and pairs of springs located beneath the middle portion of said plate.

4. In a cattle guard of the character described, a railway track, a sheet metal plate located between the rails of said track, vibratory supports secured to the underside of said plate, springs secured to the underside of said plate, and a hinged inclined plate loosely mounted at each end of said plate.

5. In a cattle guard of the character described, a railway track, a sheet metal plate located between the rails of said track, vibratory supports connected to the underside of said plate, and springs secured beneath said plate, each of said springs having a frictional slidable bearing against the underside of said plate.

6. In a cattle guard of the character described, a railway track, sets of metallic sockets located between pairs of cross ties of said track, a sheet metal plate located between the rails of said track, rocking arms hinged at their lower ends in said sockets and at their upper end to said metallic plate adjacent to the ends of said plate, and sets of metallic springs secured at one end to cross ties beneath said plate, and having their other ends in frictional slidable engagement with said plate.

7. In a cattle guard of the kind described, a railway track, a sheet metal plate located between the rails of said track, vibratory supports secured to the underside of said plate, transverse plates secured to cross ties beneath said plate, and carriage springs secured at one end to said plate and each having a friction roller at its other end, the friction rollers on said springs being located in opposite directions from each other and in slidable frictional engagement with the under side of said plate.

8. In a cattle guard of the character described, a railway track, a sheet metal plate having a lateral flange at each side located between the rails of said track, metallic sockets secured to the cross ties of said tracks and located beneath each end of said plate, vertical rods each hinged at its lower end to a metallic socket and at its upper end to said plate, transverse metallic strips located beneath the middle portion of said plate, pairs of carriage springs secured at one end in opposite directions to each other at an end of said plate, and having a friction roller at the other end in slidable engagement with the underside of the main plate, transverse plates located beneath each end of said main plate and secured to cross ties, and a transverse plate hinged to each end of said main plate and loosely resting on said plates on the cross ties.

In testimony whereof I hereunto affix my signature in presence of two witnesses.

JOHN W. COMER.

Witnesses:
SAMUEL R. SWILLING,
EDWARD J. CANARY.

Copies of this patent may be obtained for five cents each, by addressing the "Commissioner of Patents, Washington, D. C."